(12) United States Patent
Ni et al.

(10) Patent No.: US 10,360,263 B2
(45) Date of Patent: Jul. 23, 2019

(54) PARALLEL EDGE SCAN FOR SINGLE-SOURCE EARLIEST-ARRIVAL IN TEMPORAL GRAPHS

(71) Applicant: SAP SE, Walldorf (DE)

(72) Inventors: Peng Ni, Singapore (SG); Chen Wang, Singapore (SG)

(73) Assignee: SAP SE, Walldorf (DE)

( * ) Notice: Subject to any disclaimer, the term of this patent is extended or adjusted under 35 U.S.C. 154(b) by 79 days.

(21) Appl. No.: 15/658,674

(22) Filed: Jul. 25, 2017

(65) Prior Publication Data

US 2019/0034553 A1    Jan. 31, 2019

(51) Int. Cl.
*G06F 11/36* (2006.01)
*G06F 16/901* (2019.01)
*G06F 16/21* (2019.01)
*G06F 16/18* (2019.01)
*G06Q 10/06* (2012.01)

(52) U.S. Cl.
CPC ...... *G06F 16/9024* (2019.01); *G06F 11/3608* (2013.01); *G06F 16/1858* (2019.01); *G06F 16/212* (2019.01); *G06Q 10/06* (2013.01)

(58) Field of Classification Search
USPC ........................................................ 716/134
See application file for complete search history.

(56) References Cited

U.S. PATENT DOCUMENTS

| 9,122,669 | B2 | 9/2015 | Demant et al. |
| 9,576,072 | B2 | 2/2017 | Gu et al. |
| 2005/0091025 | A1* | 4/2005 | Wilson .................. G06F 17/504 703/16 |
| 2013/0332178 | A1 | 12/2013 | Zhong et al. |
| 2014/0279797 | A1* | 9/2014 | Dang ..................... G06N 5/025 706/47 |
| 2014/0324864 | A1* | 10/2014 | Choe ................. G06F 17/30823 707/737 |
| 2017/0116764 | A1* | 4/2017 | Balmin ................. G06T 11/206 |
| 2017/0154282 | A1* | 6/2017 | Rossi .................... G06N 99/005 |
| 2017/0213089 | A1* | 7/2017 | Chen ...................... G06K 9/469 |

* cited by examiner

*Primary Examiner* — Mohammed Alam
(74) *Attorney, Agent, or Firm* — Fish & Richardson P.C.

(57) ABSTRACT

Methods, systems, and computer-readable storage media for receiving data representative of the temporal graph, the data representing vertices, edges between vertices, and temporal features, determining a set of earliest-arrival dependencies, each earliest arrival dependency including an earliest feasible edge between vertices from a list of edges of the temporal graph, providing data representative of an edge-scan-dependency graph (ESD-graph) based on the data representative of the temporal graph, and the set of earliest-arrival dependencies, the ESD-graph including vertices representing edges of the temporal graph, and edges representing earliest-arrival dependencies between vertices, providing data representative of a level-assigned ESD-graph including a level assigned to each vertex of the ESD-graph, and determining earliest-arrival times between a source vertex, and each vertex of the temporal graph by executing a parallel edge scan of the level-assigned ESD-graph.

20 Claims, 7 Drawing Sheets

PARALLEL EDGE SCAN FOR SINGLE-SOURCE EARLIEST-ARRIVAL IN TEMPORAL GRAPHS

BACKGROUND

Real-world systems, including online social networks, communication networks, railway networks, and the like, are commonly modeled as temporal graphs. A temporal graph includes vertices (nodes), each vertex representing an entity in a system, and edges between vertices, each edge representing a temporal relationship between vertices. Answering earliest-arrival queries in temporal graphs is one of the most fundamental studies with numerous applications, such as information diffusion and measuring temporal closeness centrality. As the size of a temporal graph increases, processing resources required to perform queries, and query execution times increase.

SUMMARY

Implementations of the present disclosure are generally directed to determining earliest arrivals in temporal graphs. More particularly, implementations of the present disclosure are directed to a parallel edge scan for single source earliest arrival in temporal graphs. In some implementations, actions include receiving data representative of the temporal graph, the data representing vertices, edges between vertices, and temporal features, determining a set of earliest-arrival dependencies, each earliest arrival dependency including an earliest feasible edge between vertices from a list of edges of the temporal graph, providing data representative of an edge-scan-dependency graph (ESD-graph) based on the data representative of the temporal graph, and the set of earliest-arrival dependencies, the ESD-graph including vertices representing edges of the temporal graph, and edges representing earliest-arrival dependencies between vertices, providing data representative of a level-assigned ESD-graph including a level assigned to each vertex of the ESD-graph, and determining earliest-arrival times between a source vertex, and each vertex of the temporal graph by executing a parallel edge scan of the level-assigned ESD-graph. Other implementations of this aspect include corresponding systems, apparatus, and computer programs, configured to perform the actions of the methods, encoded on computer storage devices.

These and other implementations can each optionally include one or more of the following features: executing the parallel edge scan includes, for each level, performing an atomic scan operation for each edge in parallel; the atomic scan operation includes updating a tentative earliest arrival time of a destination vertex an edge if a starting time associated with the edge exceeds a tentative earliest arrival time of an origin vertex of the edge, and an ending time associated with the edge is greater than the tentative earliest arrival time of the destination vertex; updating is performed by compare-and-swap (CAS); actions further include storing all temporal edges of the ESG-graph in memory using a single array; actions further include storing sets of temporal edges in respective arrays, at least one array including edges from multiple level, and are ordered based on level within the at least one array; and a number of arrays is equal to a number of threads that execute the parallel edge scan.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
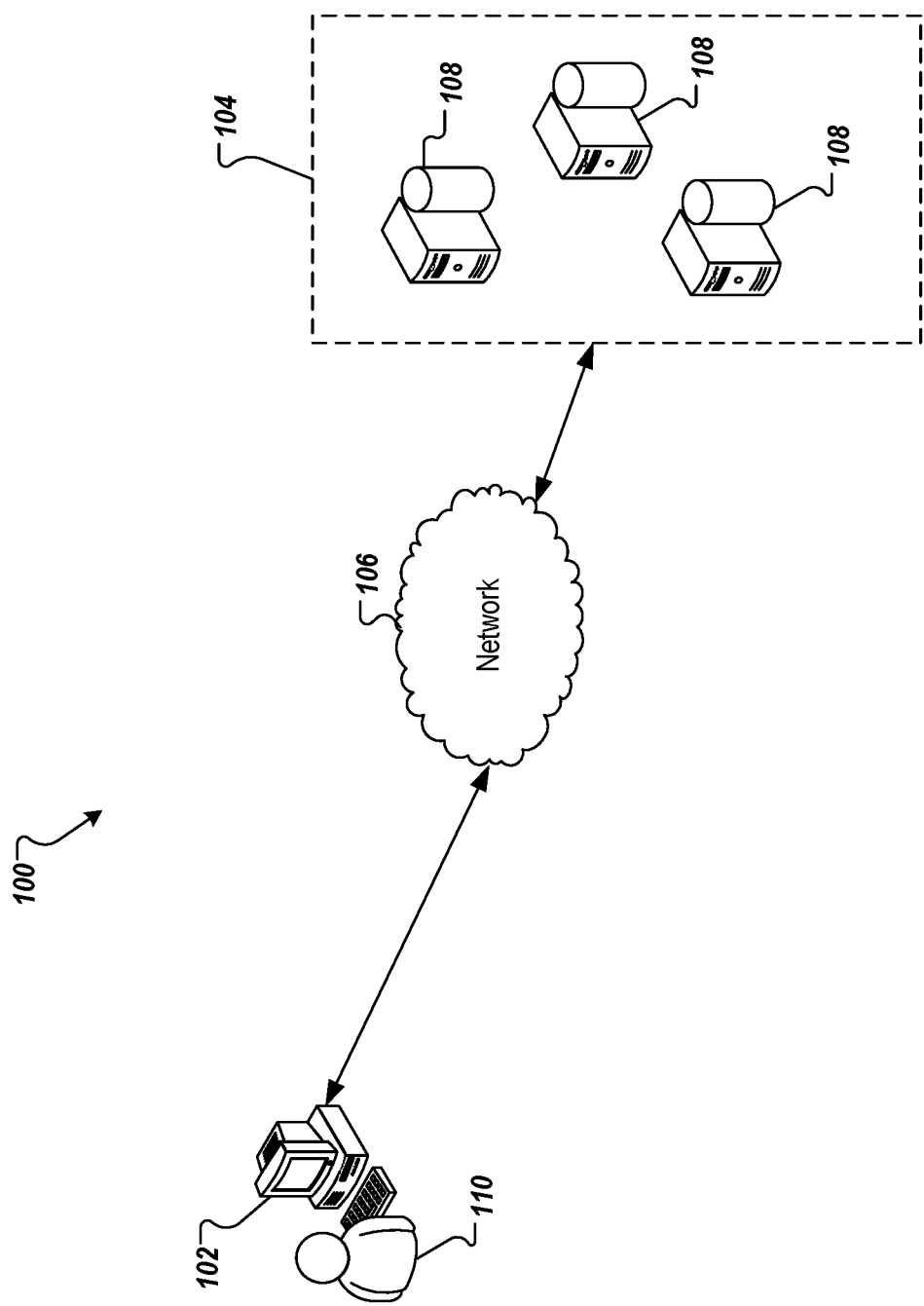
FIG. 1 depicts an example architecture that can be used to execute implementations of the present disclosure.

Implementations of the present disclosure are generally directed to determining earliest arrivals in temporal graphs. More particularly, implementations of the present disclosure are directed to a parallel edge scan for single source earliest arrival in temporal graphs. Implementations can include actions of receiving data representative of the temporal graph, the data representing vertices, edges between vertices, and temporal features, determining a set of earliest-arrival dependencies, each earliest arrival dependency including an earliest feasible edge between vertices from a list of edges of the temporal graph, providing data representative of an edge-scan-dependency graph (ESD-graph) based on the data representative of the temporal graph, and the set of earliest-arrival dependencies, the ESD-graph including vertices representing edges of the temporal graph, and edges representing earliest-arrival dependencies between vertices, providing data representative of a level-assigned ESD-graph including a level assigned to each vertex of the ESD-graph, and determining earliest-arrival times between a source vertex, and each vertex of the temporal graph by executing a parallel edge scan of the level-assigned ESD-graph.

To provide context for implementations of the present disclosure, a graph can be described as a classic abstract data type used to model real-world systems. Nodes (or vertices) in a graph represent the entities in the system and the edges represent the interactions between entities. A temporal graph differs from a non-temporal graph, in that the edges of a temporal graph carry additional temporal information. Example temporal information includes the starting timestamp, and the ending timestamp of each interaction. Many real-world systems can be modeled as temporal graphs, such as information dissemination, cell biology, infrastructural networks, brain networks, social networks, railway networks, and ecological networks, among numerous others.

In graph analytics, paths between nodes are fundamental, because they show how a node can reach another node. A path is a sequence of edges such that one edge ends at the node where the next edge of the path begins. However, paths in temporal graphs have additional constraints compared to non-temporal graphs. An example constraint is that the timestamps along the sequence of edges must temporally follow one another. Thus, in temporal graphs, paths are defined as a sequence of interactions with non-decreasing time that connect sets of nodes. Such paths can be referred to as time-respecting paths.

Given a source node and a departure time, determining an earliest-arrival time to all other nodes in a temporal graph is one of the most fundamental queries. The earliest-arrival time has numerous, practical applications including, for example, such as information diffusion in social networks. It is also the basic building block for more complex temporal graph analysis, such as connected component analysis, centrality measures, and community detection. Because of the rapid growth in size of temporal graph, such as a temporal graph representing a social network, speedup of earliest-arrival query execution time is significantly increased.

Techniques have sought to answer the single-source earliest-arrival queries, and can be classified into two approaches: vertex-centric and edge-centric. The vertex-centric approach is based on traditional vertex traversal. The temporal graph is converted into an extension of the static graph with additional time information, and earliest-arrival queries are answered using shortest-path algorithms for static graphs (e.g., Dijkstra's algorithm). The edge-centric approach uses edge scans instead of vertex traversal. The temporal graph is represented as a time-ordered sequence of edges, and the edges are sequentially processed for determining the single-source earliest-arrival time. Recent studies have shown that the edge-centric approach is more efficient for the single-source earliest-arrival query than vertex-centric approaches. Experiments on real-world data show that it outperforms the Dijkstra algorithm by one to two orders of magnitude, due to lower computation complexity, and continuous memory access patterns.

In view of this context, implementations of the present disclosure introduce parallelization of the edge-centric approach on shared memory, multi-core processors. More particularly, and as described in further detail, implementations of the present disclosure enable more rapid execution of single-source earliest-arrival queries in temporal graphs. The present disclosure introduces a new data structure referred to herein as an edge-scan-dependency graph (ESD-graph), which is used to analyze potential parallelism in a given temporal graph. The present disclosure also provides a parallel edge-centric algorithm given the parallelism returned by the ESD-graph. As described in further detail herein, with reference to experiments conducted on real-world and synthetic temporal graph data sets, implementations of the present disclosure provide multiple advantages over previous approaches. The theoretical parallelism analysis based on the number of edges that can be processed in parallel is provided, as well as a comparison of elapsed time of the single-source earliest-arrival query.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a service (e.g., provided as one or more computer-executable programs executed by one or more computing devices) for processing earliest arrival queries using the parallel, edge-centric approach of the present disclosure. For example, input data (e.g., data representative of a temporal graph) can be provided to the server system (e.g., from the client device 102), and the server system can process the input data through the service to provide a ESD-graph, which can be used to respond to earliest-arrival queries.

As introduced above, implementations of the present disclosure provide a data structure, referred to herein as an ESD-graph, which is used to analyze parallelism in a given temporal graph, as well as a parallel edge-centric algorithm for processing the parallelism returned by the ESD-graph. In general, a graph, such as the ESD-graph of the present disclosure, can be represented by any of a variety of convenient physical data structures. For example, a graph can be represented by data tuples that each represent two vertices, and a temporal relationship between vertices. As another example, each vertex can be stored as a node once, as a record or an object, for example, and linked through a linked list data structure to all the relationships the entity has and all the other entities to which the entity is related. More specifically, a graph can be stored as an adjacency list in which the adjacency information includes relationship information.

Figure 2:
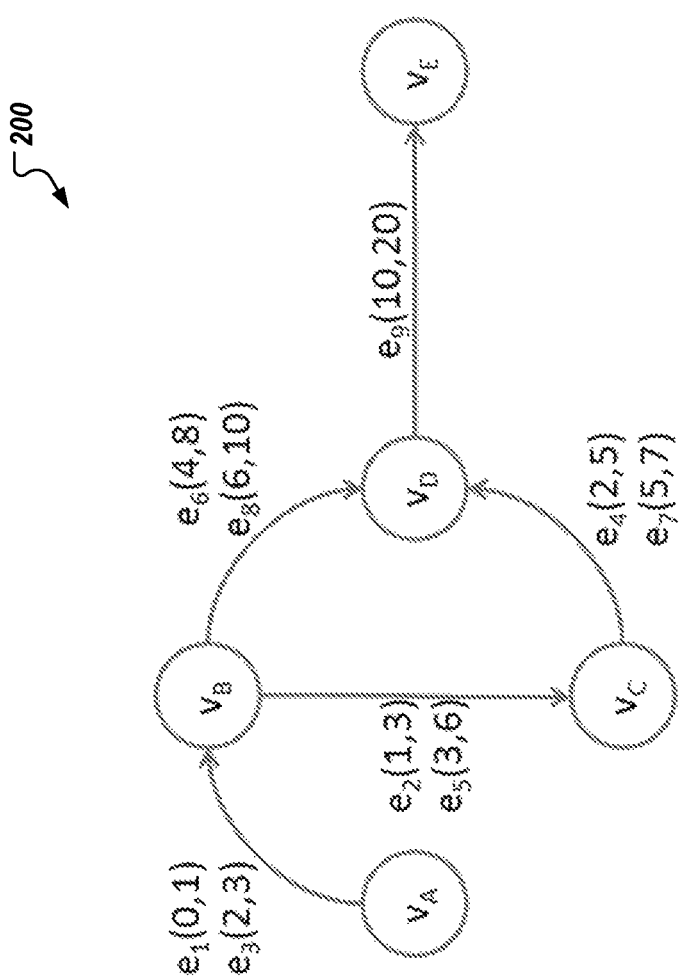
FIG. 2 depicts an example temporal graph.

A temporal graph can be provided as G=(V, E), where V and E are the set of vertices and edges respectively. An edge e∈E is a quadruple ($v_o$, $v_d$, α, ω), where $v_o$, $v_d$∈V are origin and destination vertices, and α and ω are starting time from $v_o$ and ending time at $v_d$, respectively. For purposes of discussion, it can be assumed that α<ω and $v_o$≠$v_d$ for all edges, and given two edges $e_1$($v_o$, $v_d$, $α_1$, $ω_1$) and $e_2$($v_o$, $v_d$, $α_2$, $ω_2$), then $α_1$<$α_2$⇒$ω_1$<$ω_2$. FIG. 2 depicts an example temporal graph 200. The example temporal graph includes vertices 202, and edges 204 between vertices 202. For simplicity, edges are labeled between their starting and ending vertices, so only the starting time α and ending time ω are shown. For example, from vertex $v_D$ to $v_E$, there is one edge that starts at time 10 and ends at time 20. Two edges exist from vertex $v_A$ to $v_B$, which start from vertex $v_A$ at 0 and 2, and end at $v_B$ at 1 and 3 respectively, in the example of FIG. 2.

A temporal path p in a temporal graph G is defined as a sequence of vertices p=⟨$v_1$, $v_2$, . . . , $v_k$, $v_{k+1}$⟩, where ($v_i$, $v_{i+1}$, $α_i$, $ω_i$)∈E is the i-th temporal edge on p for i∈[1, k], and $ω_i$≤$α_{i-1}$ for i∈[1, k). The starting time of the temporal path p is defined as start(p)=$α_1$, and the ending time is end(p)=$ω_k$. Given a temporal graph G, a source vertex $v_s$ and a target vertex $v_t$ in G, and departure time t, a set of temporal paths P($v_s$, $v_t$, t) is defined as {p:p is a temporal path from $v_s$ to $v_t$, s.t. start(p)≥t}.

A path p'∈P is an earliest-arrival path, if the following relationship holds:

end(p')=min{end(p):p∈P($v_s$,$v_t$,t)}

It has been shown that, if a vertex $v_t$ is reachable from $v_s$ given departure time t, there must exist an earliest-arrival path p*, such that every prefix-subpath is also an earliest-arrival path. Such a path p* is referred to as a complete earliest-arrival path.

In the temporal graph 200 of FIG. 2, given source vertex $v_B$, target vertex $v_E$ and departure time 0, edges $e_8$($v_B$, $v_D$, 6, 10) and $e_9$($v_D$, $v_E$, 10, 20) can form an earliest-arrival path. However, it is not a complete earliest-arrival path, because prefix-subpath $e_8$ does not provide the earliest arrival time for vertex $v_D$. Instead, $e_6$($v_B$, $v_D$, 4, 8) and $e_9$($v_D$, $v_E$, 10, 20) is a complete earliest-arrival path.

Given the temporal graph G=(V, E), a source vertex $v_s$∈V, and a departure time t, the so-called single-source earliest-arrival problem is to find the earliest arrival time from $v_s$ to every v∈V.

The serial edge scan algorithm is a state-of-the-art method to solve the single-source earliest-arrival problem in the temporal graph. A serial edge scan algorithm is provided as:

---
Algorithm 1: Serial Edge Scan
---
Input:   An array of sorted edges for a temporal graph G(V,E), source vertex $v_s$, departure time t
Output:  The earliest arrival time from $v_s$ to every vertex v∈V
    Initialize a[$v_s$]=t, and a[v]=∞ ∀v∈V and v≠$v_s$
    for each edge e($v_o$,$v_d$,α,ω) in the sorted array do
        Scan(e, a[$v_o$], a[$v_d$])
    end
    return a[v] for each v∈V
---

The data structure used by the serial edge scan algorithm is an array, which contains all temporal edges sorted by either starting time, or ending time. Given a single-source earliest-arrival query with a source vertex $v_s$ and a departure time t, the initialization step is the same as vertex-centric approaches. Let a[v] denote the tentative earliest arrival time from the source $v_s$ to vertex v, then a[v]=∞∀v∈V, v≠$v_s$, and a[$v_s$]=t. Next, each edge is scanned and processed based on the sorted order. As shown in Algorithm 2, below, for each edge e($v_o$, $v_d$, α, ω), the algorithm first checks if the edge is feasible (i.e., if the starting time α is equal to or later than the tentative earliest arrival time of origin vertex a[$v_o$]). If the edge is feasible, and taking the edge improves the tentative earliest arrival time of destination a[$v_d$], the earliest arrival time is updated to be the new value ω.

---
Algorithm 2: Basic Edge Scan - Scan( )
---
Input:   An edge e($v_o$,$v_d$,α,ω), tentative earliest arrival time a [$v_o$], a[$v_d$]
         if α ≥ a[$v_o$] and ω< a[$v_d$] then
             a[$v_d$]
         end
---

Figure 3A:
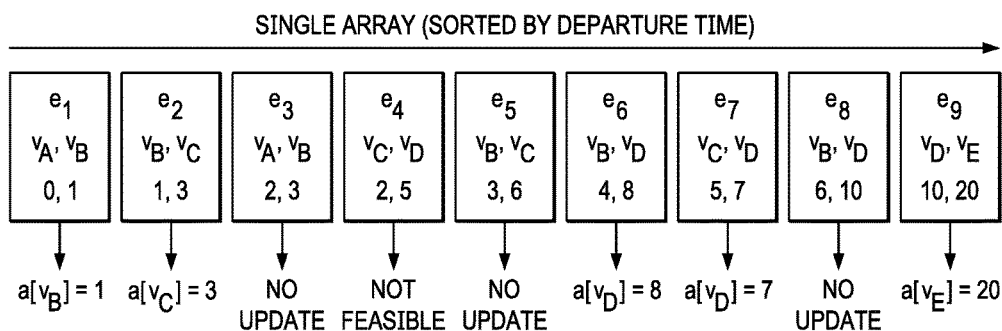
FIGS. 3A and 3B respectively depict an example serial edge scan, and an example parallel edge scan based on the example temporal graph of FIG. 2.

FIG. 3A depicts an example serial edge scan assuming a single-source earliest-arrival query being issued in the temporal graph 200 of FIG. 2, given source vertex $v_A$ and departure time 0. Firstly, all edges are sorted into a starting time ordered edge array. Then for each edge, the results of FIG. 3A are provided. For instance, when edge $e_1$($v_A$, $v_B$, 0, 1) is scanned, its starting time is 0, which is equal to the earliest arrival time of $v_A$, making $e_1$ feasible. The ending time 1 is earlier than a[$v_B$], thus a[$v_B$] is updated to be 1. Similarly scanning edge $e_2$($v_B$, $v_C$, 1, 3) updates the earliest arrival time of $v_C$ to be 3. When edge $e_3$($v_A$, $v_B$, 2, 3) is scanned, although it is feasible, the ending time 3 is later than a[$v_B$], thus there is no update needed. When edge $e_4$($v_C$, $v_D$, 2, 5) is scanned, the earliest arrival time of $v_C$ is 3, thus the edge is not feasible to take. Accordingly, by scanning all the edges sequentially, the earliest arrival time for all vertices can be determined.

Figure 3B:
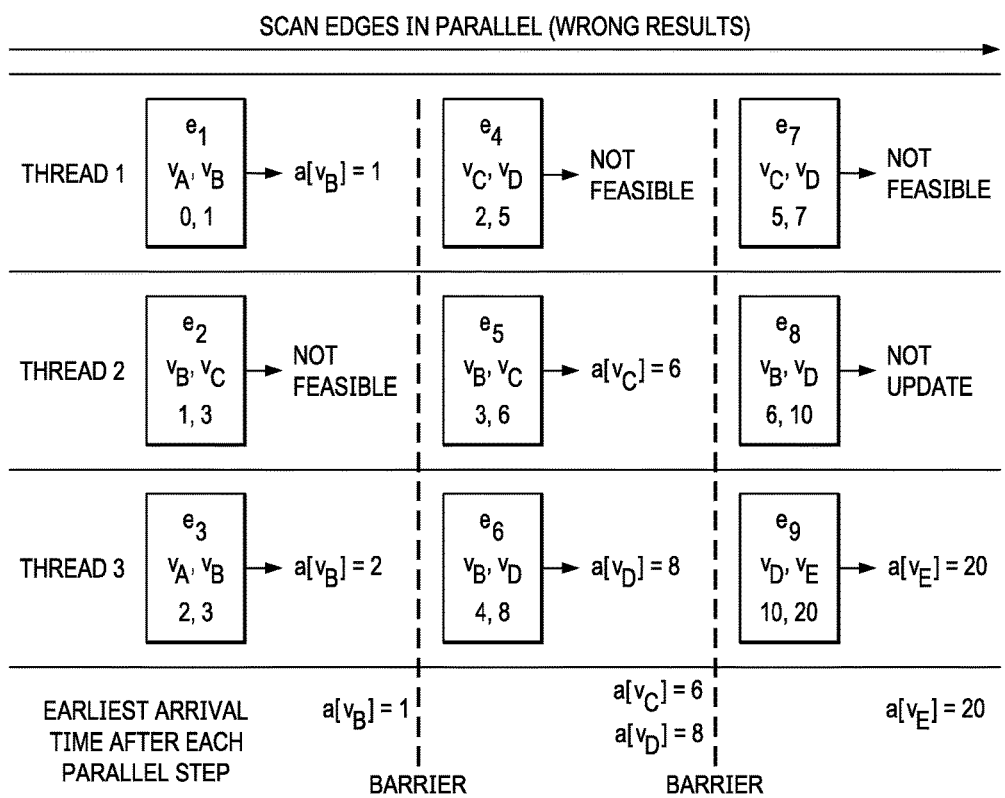

Since the correctness of the serial algorithm depends on the scanning order of edges, naive parallelization on the sorted edge array data structure may not generate the correct result for all cases. For example, the edge scans of FIG. 3A can be parallelized using three threads, and the edges are distributed to threads in a round-robin manner, then threads perform the edge scan operation on the allocated edges in parallel through multiple synchronized steps. FIG. 3B depicts an example parallel edge scan based on the example temporal graph 200 of FIG. 2. Locking or compare-and-swap technique, discussed in further detail herein, can be used to ensure atomic update of the earliest arrival time of vertices. However, this will still result in a wrong single-source earliest-arrival query result.

With particular reference to FIG. 3B, with edge $e_1$ distributed to thread 1, $e_2$ to thread 2 and so on. The earliest arrival time of vertex $v_C$ and $v_D$ are not calculated correctly. This is because edge $e_1$($v_A$, $v_B$, 0, 1) needs to be scanned before $e_2$($v_B$, $v_C$, 1, 3) so that the earliest arrival time of $v_B$ is updated first. Since $e_1$ and $e_2$ are scanned in parallel and a[$v_B$] is not updated, the scan result of $e_2$ is not feasible and a[$v_C$] misses its correct earliest arrival time. There is no existing tools to automatically detect and resolve the errors. In view of this, and as described in further detail herein, the present disclosure provides the ESD-graph (data structure), and use of the ESD-graph to analyze the edge scan dependencies.

In accordance with the present disclosure, the ESD-graph shows parallelism in a temporal graph by capturing the dependencies of edge scan orders. The present disclosure provides a parallel algorithm to answer single-source earliest-arrival queries based on the parallelism returned by the ESD-graph.

To construct an ESD-graph, an earliest-arrival dependency is defined as a binary relation (denoted as '→') between two temporal graph edges $e(v_o, v_d, \alpha, \omega)$, $e'(v'_o, v'_d, \alpha', \omega') \in E$ as follows:
e→e' if
1. $v'_o = v_d$ and $\alpha' \geq \omega$, and
2. $\nexists e''(v'_o, v'_d, \alpha'', \omega'')$, such that $\alpha'' \geq \omega$ and $\omega'' < \omega'$ In other words, given two edges e and e', they form an earliest-arrival dependency if 1) the two edges can form a time-respecting path, and 2) e' leads to an earliest arrival time at its destination vertex $v'_d$.

With reference to the example temporal graph 200 of FIG. 2, one earliest-arrival dependency example is $e_3(v_A, v_B, 2, 3) \rightarrow e_6(v_B, v_D, 4, 8)$, since they can form a time-respecting path, and no other edges can improve the earliest arrival time at $v_D$ without breaking the time-respecting path requirement. Edges $e_3(v_A, v_B, 2, 3)$ and $e_8(v_B, v_D, 6, 10)$ do not have earliest arrival dependency, although they can form a time-respecting path. This is because taking edge $e_6(v_B, v_D, 4, 8)$ can lead to an earlier arrival time at vertex $v_D$.

Algorithm 3 can be performed to determine the set of all earliest-arrival dependencies (denoted as D), given a temporal graph G(V, E). Let $l(v_o, v_d)$ denote the list of all edges from vertex $v_o$ to $v_d$. Initially, all edges $l(v_o, v_d)$ are sorted between each connected pair of vertices $v_o$ to $v_d$ by ascending starting time. Then, for each edge $e(v_u, v_v, \alpha, \omega) \in E$, the outgoing vertices of $v_v$ are looped through. For each outgoing vertex $v_w$, binary search is used to find the earliest feasible edge from the list of edges $l(v_v, v_w)$ from $v_v$ to $v_w$. If such an edge e' exists, the earliest-arrival dependency e→e' is added to the set D.

---

Algorithm 3: Determining Earliest Arrival Dependencies

```
Input: A temporal graph G(V,E)
Output: The set of all earliest-arrival dependencies D
foreach vertex v_o ∈ V do
    foreach outgoing vertex v_d of v_o do
        Sort l(v_o,v_d) by ascending starting time
    end
end
foreach edge e(v_u,v_v,α,ω) ∈ E do
    foreach outgoing vertex v_w of v_v do
        low = 0
        high = l(v_v,v_w).size( ) – 1
        earliest = 1
        while low ≤ high do
            mid = (low + high)/ 2
            edge e'(v_w,v_w,α',ω') = l(v_v,v_w).get(mid)
            if α' ≥ ω then
                if earliest > mid then
                    earliest = mid
                end
                high = mid – 1
            else
                low = mid + 1
            end
        if earliest is not 1 then
            edge e' = l(v_v,v_w).get(earliest)
            D.add(e → e')
        end
    end
end
```

---

The relation between earliest-arrival dependency and the previously defined complete earliest-arrival path is shown in Theorem 1, which is proven by Proof 1:

Theorem 1→Let $p = (v_1, v_2, \ldots, v_k, v_{k+1})$ be a complete earliest-arrival path in G, where $e_i = (v_i, v_{i+1}, \alpha_i, \omega_i) \in E$, $i \in [1, k]$ is the i-th temporal edge on p. For $\forall i \in [1, k)$, $e_i \rightarrow e_{i+1}$.

Proof 1→Theorem 1 can be proven by contradiction. Assume there exists an index $m \in [1, k]$, such that edges $e_m$ and $e_{m+1}$ on a complete earliest-arrival path p do not form an earliest-arrival dependency. Then, another edge $e_n$ can be found such that $e_m \rightarrow e_n$. Since taking edge $e_n$ leads to an earlier arrival time compared to taking edge $e_{m-1}$, path $e_1$, $e_2, \ldots, e_m, e_{m+1}$ is not an earliest-arrival path. This is contradictory to the assumption that p is a complete earliest-arrival path. Thus, m does not exist and for $\forall i \in [1, k]$, $e_i \rightarrow e_{i+1}$.

For a temporal graph G(V, E), its ESD-graph data structure is an unweighted directed graph $\tilde{G}(\tilde{V}, \tilde{E})$. The construction of $\tilde{G}$ includes:
1. Vertex creation: for each edge $e \in E$ in G, create a vertex $\tilde{v} \in \tilde{V}$ in $\tilde{G}$.
2. Edge creation: for each pair of vertices $\tilde{v}, \tilde{v}' \in \tilde{V}$, if their corresponding edges $e, e' \in E$ have an earliest-arrival dependency e→e', create a directed edge from $\tilde{v}$ to $\tilde{v}'$.

Figure 4A:
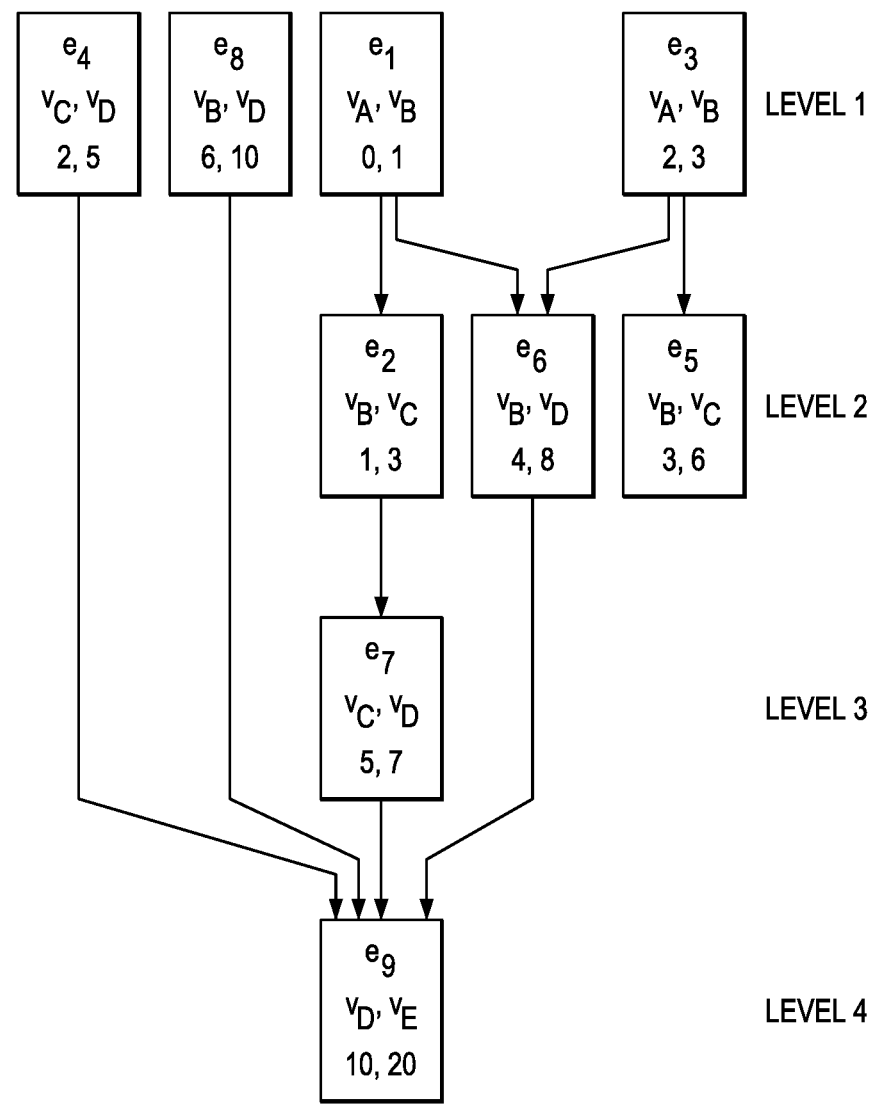
FIGS. 4A, 4B, and 4C respectively depict an example edge scan dependency (ESD) graph, an example basic approach, and an example cache-efficient approach in accordance with implementations of the present disclosure.

The ESD-graph is an edge-centric data structure that focuses on the relations between temporal edges. FIG. 4A depicts an example ESD-graph for the temporal graph 200 of FIG. 2. The vertices in FIG. 4A correspond to temporal edges 204 in FIG. 2, and they are connected by earliest-arrival dependencies.

For each vertex $\tilde{v}$ in an ESD-graph, a property level is provided as follows:
1. If $\tilde{v}$ is a root vertex, i.e., $\tilde{v}$ has no incoming neighbors, then level($\tilde{v}$)=1;
2. If $\tilde{v}$ is not a root vertex, then level($\tilde{v}$) is equal to the length of the longest path from any root vertex that can reach $\tilde{v}$.

Since each vertex $\tilde{v}$ in the ESD-graph corresponds to a temporal edge e in the original temporal graph, we extend the property level to work for temporal edges, that is, level(e)=level($\tilde{v}$). The level L of a temporal graph as defined as L=max(level(e)), $e \in E$, which is the maximum level among all its temporal edges.

In the example of FIG. 4A, vertices of the same level are drawn horizontally, with their level written on the right. The four root vertices are $e_1$, $e_3$, $e_4$ and $e_8$, and their level is 1. For vertex $e_9$, all root vertices can reach it. The longest path is $e_1 \rightarrow e_2 \rightarrow e_7 \rightarrow e_9$, and is designated as level 4.

Algorithm 4, below, depicts determination of the level of each vertex in the ESD-graph. It works in a similar way as breath-first-search (BFS). In the initialization, three empty sets are created, to hold the current, next and visited set of vertices. All root vertices are put into the current set, and lvl is initialized to be 1. In each iteration, we first put all vertices in the current set to visited set. Then, for each vertex $\tilde{v}$ in the current set, we check each of its outgoing vertex $\tilde{v}'$. If all the incoming vertices have been visited, $\tilde{v}'$ is added into the next set. The current set is swapped with the next set, and lvl is increased by 1. When there is no further vertices in the current set, the process ends.

---

Algorithm 4: Assigning Levels to Vertices in ESD-graph

```
Input: An ESD-Graph structure G̃(Ṽ,Ẽ)
Output: The level for every vertex ṽ ∈ Ṽ
Create three empty sets current,next,visited
foreach root vertex ṽ in Ṽ do
    current.add(ṽ)
end
int lvl = 1
while current is not empty do
    foreach vertex ṽ ∈ current do
        visited.add(ṽ)
```

```
Algorithm 4: Assigning Levels to Vertices in ESD-graph level(ṽ) = lvl
            foreach outgoing vertex ẽ' of ṽ do
                if all incoming vertices of ṽ' ∈ visited then
                    next.add(ṽ')
                end
            end
        end
        current = next
        next.clear( )
        lvl + +
    end
    return level(ṽ) for each ṽ ∈ Ṽ
```

With each temporal edge assigned a level based on the ESD-graph, a parallel edge scan is executed to answer single-source earliest-arrival queries. A parallel edge scan of the present disclosure is provided in Algorithm 5:

```
Algorithm 5: Parallel Edge Scan

Input:    temporal edges E with assigned levels, source
          vertex v_s, departure time t
Output:   The earliest arrival time from v_s to every vertex
          v ∈ V
Initialize a[v_s] = t, and a[v] = ∞∀v ∈ V and v ≠ v_s
for i = 1..L do
    for each edge e(v_o,v_d,α,ω) s.t. level(e) = i do in parallel
        AtomicScan(e; a[v_o]; a[v_d])
    end
    barrier( )
end
return a[v] for each v ∈ V
```

The parallel edge scan initializes the earliest arrival time of source vertex to be the given departure time and all other vertices to be ∞. Next it scans edges starting from level 1, following the order of their level. All edges in the same level are scanned in parallel. A barrier synchronization is inserted to ensure all edges of the current level have been scanned before moving on to the next level.

When multiple threads scan edges and update earliest arrival time concurrently, race conditions may occur. For example, in the example of FIG. 4A, edges $e_1(v_A, v_B, 0, 1)$ and $e_3(v_A, v_B, 2, 3)$ can be scanned in parallel. However, they both update the earliest arrival time of vertex $v_B$. An atomic update is executed to provide that the final value written to $v_B$ is the smallest amongst all updates. Consequently, an atomic edge scan of Algorithm 5 is implemented.

The following example theorem can be provided, which is proven by the subsequent proof:

Theorem 2→Algorithm 5 correctly computes the earliest arrival time for any vertex v∈V, if an earliest arrival path from $v_s$ to v given departure time t exists in G, otherwise a[v]=∞.

Proof 2→For any $v_d$∈V, if an earliest-arrival path from $v_s$ to $v_d$ exists, there must exist a complete earliest-arrival path $p(v_s=v_1, v_2, \ldots, v_k, v_{k+1}=v_d)$. Let $e_i=(v_i, v_{i+1}, α_i, ω_i)$∈E, i∈[1, k] be the i-th temporal edge on p. Based on Theorem 2, for ∀i∈[1, k), we have $e_i→e_{i+1}$. Then there exists a directed edge from $e_i$ to $e_{i+1}$ in ESD-Graph. Since $e_i$ is an incoming neighbor of $e_{i+1}$, level($e_{i-1}$)≥level($e_i$)+1. Algorithm 5 scans edges level by level as shown in line 2. Thus $e_i$ is scanned before $e_{i+1}$ for i∈[1, k]. Based on the correctness of serial edge scan algorithm, it is known that the earliest arrival time for $v_d$ is also correct. Lastly, if a vertex is not reachable in the original temporal graph (i.e., there does not exist a path from $v_s$ to the vertex), the earliest arrival time will remain to be ∞ as initialized at line 1 of Algorithm 5.

The time complexity of Algorithm 5 is the same as the serial edge scan algorithm, which is |E|+|V|. However, the real execution time can be much shorter due to parallelization. For example, it can be assumed that the synchronization overhead per barrier is ε, and the number of available threads of a processor is θ. Given a query with serial algorithm running time $T_s$, the parallel algorithm running time $$T_p = \frac{T_s}{\theta} + L \cdot \varepsilon.$$

The present disclosure further provides techniques for improving performance: compare-and-swap (CAS)-based atomic earliest arrival time update, and cache-efficient memory allocation for temporal graph edges.

With regard to CAS-based atomic earliest arrival time update, CAS can be used to implement the atomic update operation in a similar manner as shared memory graph processing. CAS is an atomic instruction used for synchronization between threads. It has three arguments: a memory location, an old value, and a new value. If the value stored in the memory location is equal to the old value, it will be replaced with the new value, and the instruction returns true. Otherwise, the memory is not updated and false is returned.

An example CAS-based edge scan operation is shown in Algorithm 6, below. In Algorithm 6, CAS is used to update the earliest arrival time $a[v_d]$. Initially the flag updated is set to false. In Algorithm 6, each thread tries to use CAS to update the earliest arrival time. If successful, the scan will complete. Otherwise, the old value is read, and CAS is called again to update the earliest arrival time.

```
Algorithm 6: CAS-based Edge Scan - AtomicScan( )

Input: An edge e(v_o,v_d,α,ω), tentative earliest arrival time
       a[v_o], a[v_d]
if α ≥ a[v_o] then
    oldValue = a[v_d]
    if ω < oldValue then
        updated = false
        while updated ≠ true do
            updated = CAS(a[v_d],oldValue,ω)
            oldValue = a[v_d]
        end
    end
end
```

Figure 4B:
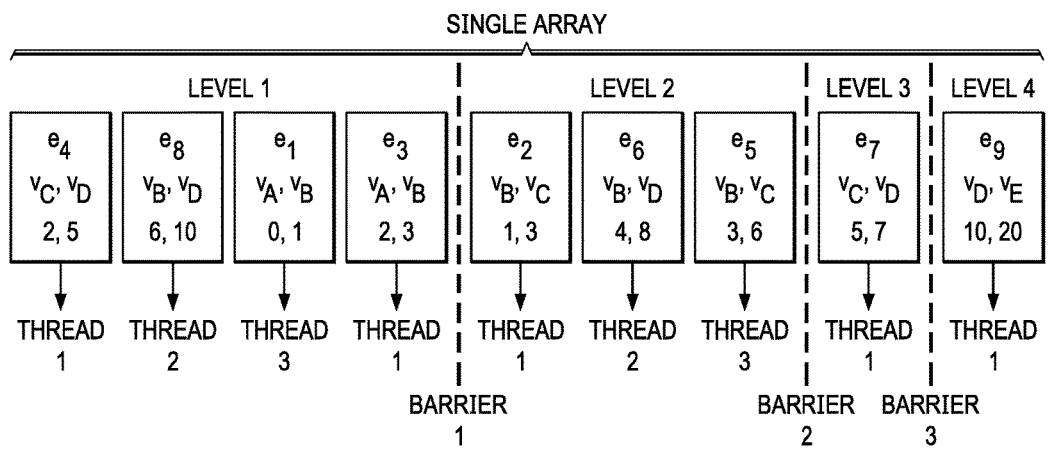

With regard to cache-efficient memory allocation, the parallel edge scan of the present disclosure scans temporal edges level-by-level. One naive solution to store all temporal edges in memory is to use a single array, where edges are ordered by their level. An additional array is used to mark the starting position of each level. During runtime, edges are retrieved level-by-level, and edges of the same level are distributed to multiple threads in a round-robin manner. FIG. 4B shows an illustration for this approach, based on the ESD-Graph shown in FIG. 4A. However, this approach is not cache efficient, because each thread needs to access the entire array since its allocated edges are scattered all over the array. Assuming each thread is executing on a different core in the processor, the same array will be pre-fetched to the cache of each core.

Figure 4C:
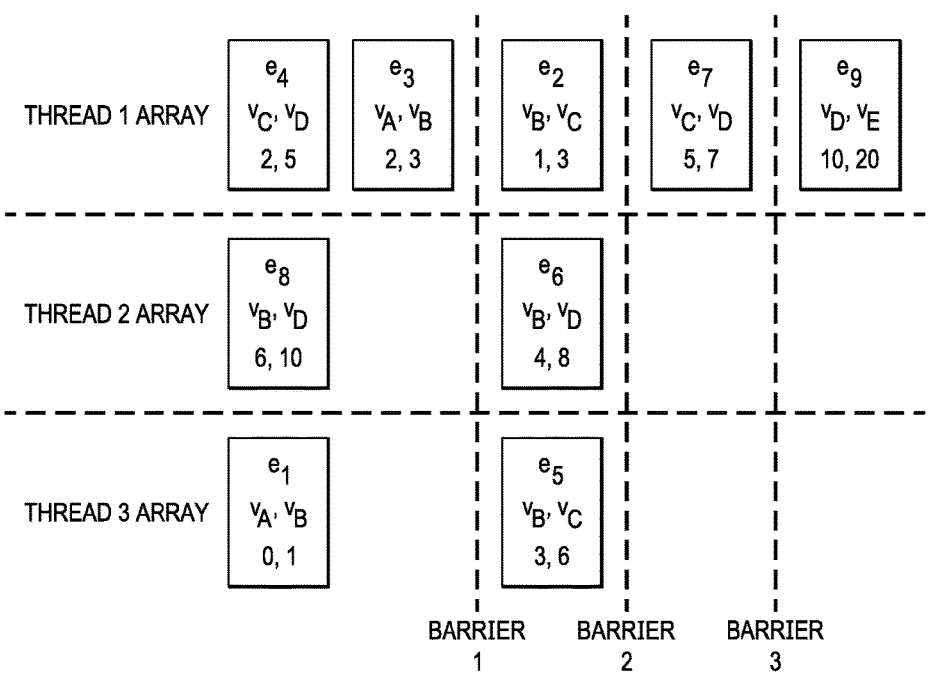

In view of this, implementations of the present disclosure provide a cache-efficient data structure by reorganizing the edges based on the number of available threads. For each thread, a separate array of edges is provided, each of which contains edges from all levels. Within each array, edges are ordered by level, and synchronization marks are inserted between edges of different levels. Consequently, each core only prefetches the corresponding array to its own cache. FIG. 4C depicts the idea of this approach. In the depicted example, three arrays are created, one for each thread. Initially all threads scan edges of level 1. Individual threads scan the edges in each array sequentially. The threads will be blocked at a synchronization barrier until all the threads reach the same barrier. Then, threads proceed to scan edges of the next level. The process continues until edges of the last level are scanned.

Figure 5:
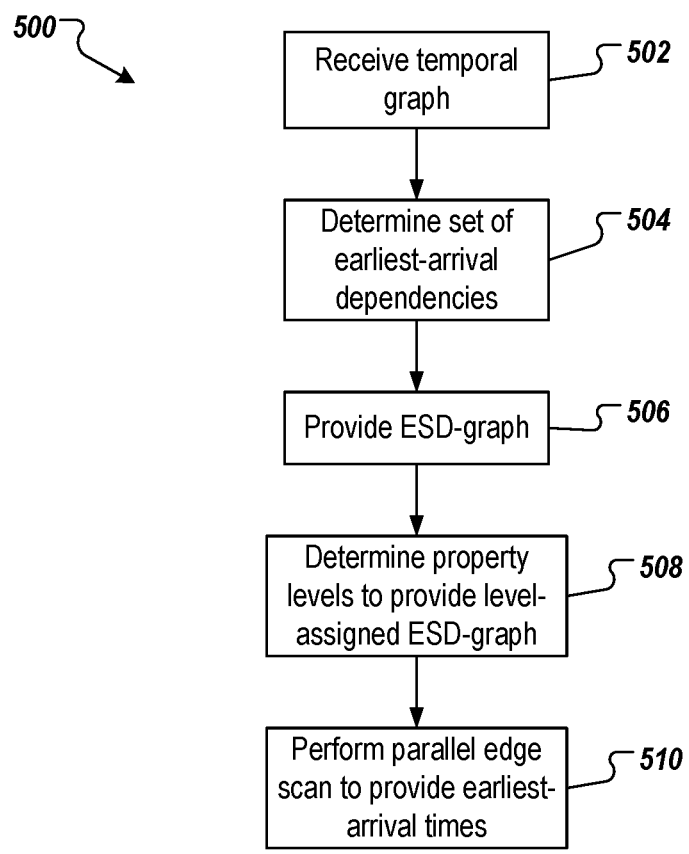
FIG. 5 depicts an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices. The example process 500 can be performed to perform a parallel edge scan for single source earliest arrival in a temporal graph.

A temporal graph (G) is received (502). For example, data (e.g., tuples, linked-lists) representative of a temporal graph is received by a computing system (e.g., a server device 108 of FIG. 1). In some examples, the data represents vertices of the temporal graph, edges between vertices, as well as temporal data associated with each vertex. A set of earliest-arrival time dependencies (D) is determined (504). For example, the computing system processes the data representative of the temporal graph using Algorithm 3 to provide the set of earliest-arrival time dependencies (D), as described herein. An ESD-graph ($\tilde{G}$) is provided (506). For example, the computing system processes the data representative of the temporal graph, and the set of earliest-arrival time dependencies (D) to provide the ESD-graph ($\tilde{G}$) (e.g., data representative of the ESD-graph), as described herein. Property levels are assigned for each vertex ($\tilde{v}$) in the ESD-graph ($\tilde{G}$) (508). For example, the computing system processes the ESD-graph ($\tilde{G}$) using Algorithm 4 to provide a level-assigned ESD graph (e.g., data representative of the level-assigned ESD-graph). A parallel edge-scan is performed (510). For example, the computing system processes the level-assigned ESD-graph to determine earliest-arrival times from a source vertex of the temporal graph ($\tilde{G}$) to each vertex of the temporal graph ($\tilde{G}$).

Implementations of the present disclosure provide one or more of the following example advantages. The parallel edge scan of the present disclosure reduces the time required to execute earliest arrival queries in temporal graphs. Further, implementations of the present disclosure enable increased processor utilization in multi-core CPU's, as well as providing cache-efficient data structures, which reduce the number of CPU cache misses.

Figure 6:
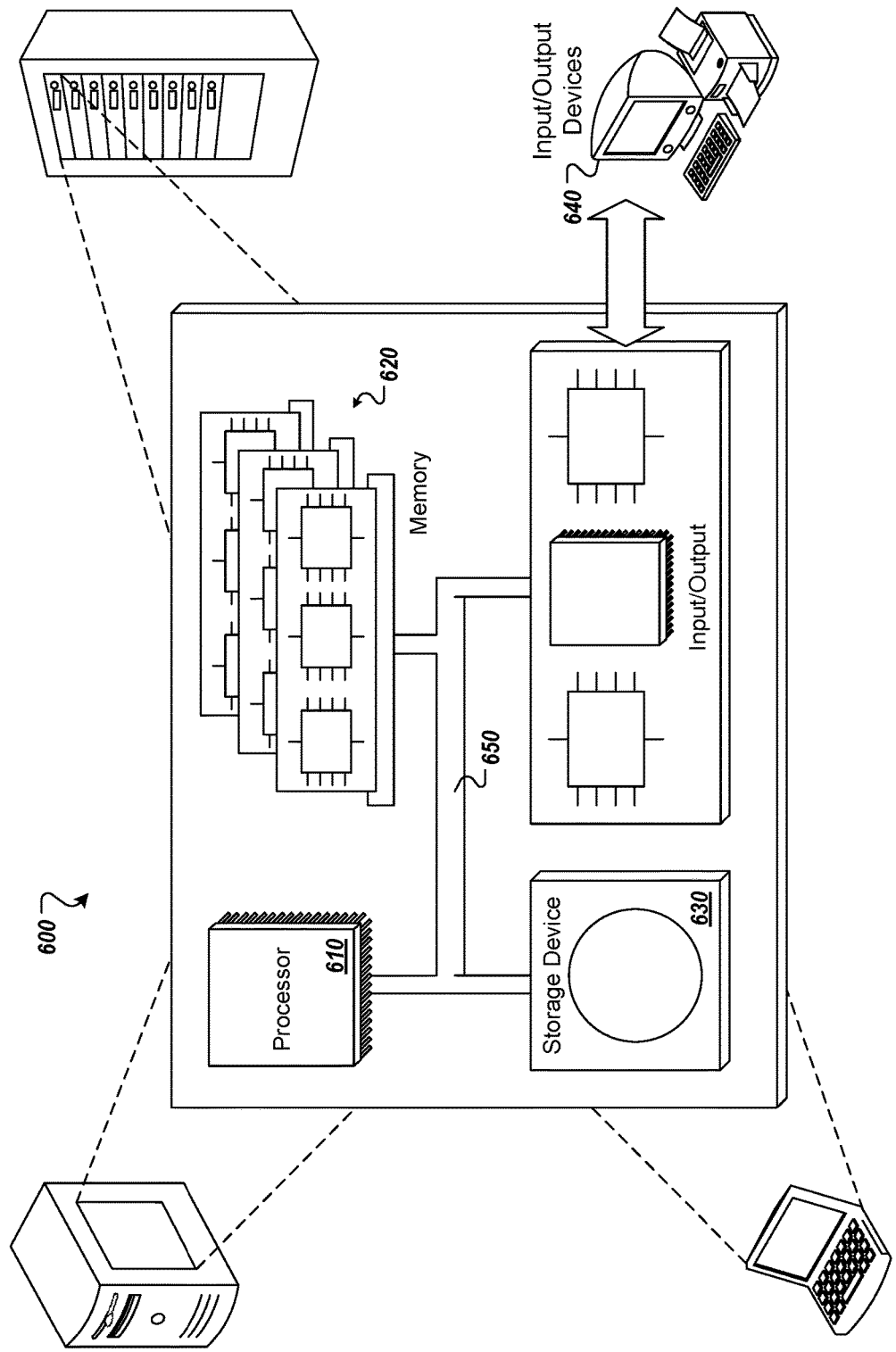
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining earliest-arrival times in a temporal graph, the method being executed by one or more processors and comprising:
   receiving, by the one or more processors, data representative of the temporal graph, the data representing vertices, edges between vertices, and temporal features;
   determining, by the one or more processors, a set of earliest-arrival dependencies, each earliest-arrival dependency comprising an earliest feasible edge between vertices from a list of edges of the temporal graph;
   providing, by the one or more processors, data representative of an edge-scan-dependency graph (ESD-graph) based on the data representative of the temporal graph, and the set of earliest-arrival dependencies, the ESD-graph comprising vertices representing edges of the temporal graph, and edges representing earliest-arrival dependencies between vertices;
   providing, by the one or more processors, data representative of a level-assigned ESD-graph comprising a property level assigned to each vertex of the ESD-graph; and
   determining, by the one or more processors, for a particular departure time, the earliest-arrival times between a source vertex, and each vertex of the temporal graph by executing a parallel edge scan of the level-assigned ESD-graph such that all edges of a respective property level are scanned in parallel.

2. The method of claim 1, wherein executing the parallel edge scan comprises, for each level, perform an atomic scan operation for each edge in parallel.

3. The method of claim 2, wherein the atomic scan operation comprises updating a tentative earliest arrival time of a destination vertex an edge if a starting time associated with the edge exceeds the tentative earliest arrival time of an origin vertex of the edge, and an ending time associated with the edge is greater than the tentative earliest arrival time of the destination vertex.

4. The method of claim 3, wherein updating is performed by compare-and-swap (CAS).

5. The method of claim 1, further comprising storing all temporal edges of the ESD-graph in memory using a single array.

6. The method of claim 1, further comprising storing sets of temporal edges in respective arrays, at least one array comprising edges from multiple level, and are ordered based on level within the at least one array.

7. The method of claim 6, wherein a number of arrays is equal to a number of threads that execute the parallel edge scan.

8. A non-transitory computer-readable storage medium coupled to one or more processors and having instructions stored thereon which, when executed by the one or more processors, cause the one or more processors to perform operations for parallel edge scan for determining earliest-arrival times in a temporal graph, the operations comprising:
   receiving data representative of the temporal graph, the data representing vertices, edges between vertices, and temporal features;
   determining a set of earliest-arrival dependencies, each earliest arrival dependency comprising an earliest feasible edge between vertices from a list of edges of the temporal graph;
   providing data representative of an edge-scan-dependency graph (ESD-graph) based on the data representative of the temporal graph, and the set of earliest-arrival dependencies, the ESD-graph comprising vertices representing edges of the temporal graph, and edges representing earliest-arrival dependencies between vertices;
   providing data representative of a level-assigned ESD-graph comprising a property level assigned to each vertex of the ESD-graph; and
   determining, for a particular departure time, the earliest-arrival times between a source vertex, and each vertex of the temporal graph by executing a parallel edge scan of the level-assigned ESD-graph such that all edges of a respective property level are scanned in parallel.

9. The non-transitory computer-readable storage medium of claim 8, wherein executing the parallel edge scan comprises, for each level, perform an atomic scan operation for each edge in parallel.

10. The non-transitory computer-readable storage medium of claim 9, wherein the atomic scan operation comprises updating a tentative earliest arrival time of a destination vertex an edge if a starting time associated with the edge exceeds the tentative earliest arrival time of an origin vertex of the edge, and an ending time associated with the edge is greater than the tentative earliest arrival time of the destination vertex.

11. The non-transitory computer-readable storage medium of claim 10, wherein updating is performed by compare-and-swap (CAS).

12. The non-transitory computer-readable storage medium of claim 8, wherein operations further comprise storing all temporal edges of the ESD-graph in memory using a single array.

13. The non-transitory computer-readable storage medium of claim 8, wherein operations further comprise storing sets of temporal edges in respective arrays, at least one array comprising edges from multiple level, and are ordered based on level within the at least one array.

14. The non-transitory computer-readable storage medium of claim 13, wherein a number of arrays is equal to a number of threads that execute the parallel edge scan.

15. A system, comprising:
a computing device; and
a computer-readable storage device coupled to the computing device and having instructions stored thereon which, when executed by the computing device, cause the computing device to perform operations for parallel edge scan for determining earliest-arrival times in a temporal graph, the operations comprising:
receiving data representative of the temporal graph, the data representing vertices, edges between vertices, and temporal features;
determining a set of earliest-arrival dependencies, each earliest arrival dependency comprising an earliest feasible edge between vertices from a list of edges of the temporal graph;
providing data representative of an edge-scan-dependency graph (ESD-graph) based on the data representative of the temporal graph, and the set of earliest-arrival dependencies, the ESD-graph comprising vertices representing edges of the temporal graph, and edges representing earliest-arrival dependencies between vertices;
providing data representative of a level-assigned ESD-graph comprising a property level assigned to each vertex of the ESD-graph; and
determining, for a particular departure time, the earliest-arrival times between a source vertex, and each vertex of the temporal graph by executing a parallel edge scan of the level-assigned ESD-graph such that all edges of a respective property level are scanned in parallel.

16. The system of claim 15, wherein executing the parallel edge scan comprises, for each level, perform an atomic scan operation for each edge in parallel.

17. The system of claim 16, wherein the atomic scan operation comprises updating a tentative earliest arrival time of a destination vertex an edge if a starting time associated with the edge exceeds the tentative earliest arrival time of an origin vertex of the edge, and an ending time associated with the edge is greater than the tentative earliest arrival time of the destination vertex.

18. The system of claim 17, wherein updating is performed by compare-and-swap (CAS).

19. The system of claim 15, wherein operations further comprise storing all temporal edges of the ESD-graph in memory using a single array.

20. The system of claim 15, wherein operations further comprise storing sets of temporal edges in respective arrays, at least one array comprising edges from multiple level, and are ordered based on level within the at least one array.

* * * * *